United States Patent [19]

Wheeler

[11] 3,922,713

[45] Nov. 25, 1975

[54] UNIDIRECTIONAL COLOR ENHANCEMENT CIRCUIT

[75] Inventor: Robert Charles Wheeler, Elba, N.Y.

[73] Assignee: GTE Sylvania Incorporated, Stamford, Conn.

[22] Filed: July 15, 1974

[21] Appl. No.: 488,729

[52] U.S. Cl. ..................... 358/37; 358/30; 330/183

[51] Int. Cl.$^2$ ..................... H04N 5/14; H04N 9/52

[58] Field of Search ............ 358/27, 28, 29, 37, 39, 358/40, 30, 80; 330/29, 30 R, 22, 110, 183

[56] References Cited

UNITED STATES PATENTS

| | | | |
|---|---|---|---|
| 3,541,234 | 11/1970 | Austin | 358/40 |
| 3,586,765 | 6/1971 | Jirka | 358/27 |
| 3,843,958 | 10/1974 | Furrey | 358/27 |

OTHER PUBLICATIONS

"Automatic Tint Correction in Color TV;" by F. H. Belt, Electronics World, Aug. 1971, pp. 45–48 inc.

"Automatic Color Controls," by H. Stevens, Radio Electronics, Jan. 1973, pp. 45, 50–52, 71, 98.

*Primary Examiner*—Benedict V. Safourek
*Assistant Examiner*—R. John Godfrey
*Attorney, Agent, or Firm*—Norman J. O'Malley; Thomas H. Buffton; Robert T. Orner

[57] ABSTRACT

In a television receiver having a luminance and color matrix system wherein first, second, and third color amplifier stages each have an output circuit providing a color signal, an input circuit coupled or connected to one of a plurality of color difference signal sources, and a second input circuit coupled by a drive circuit to a luminance signal source, a unidirectional color enhancement circuit includes at least one unidirectional conduction device and an impedance series coupling the second input circuits of at least two of the first, second, and third color amplifier stages.

10 Claims, 1 Drawing Figure

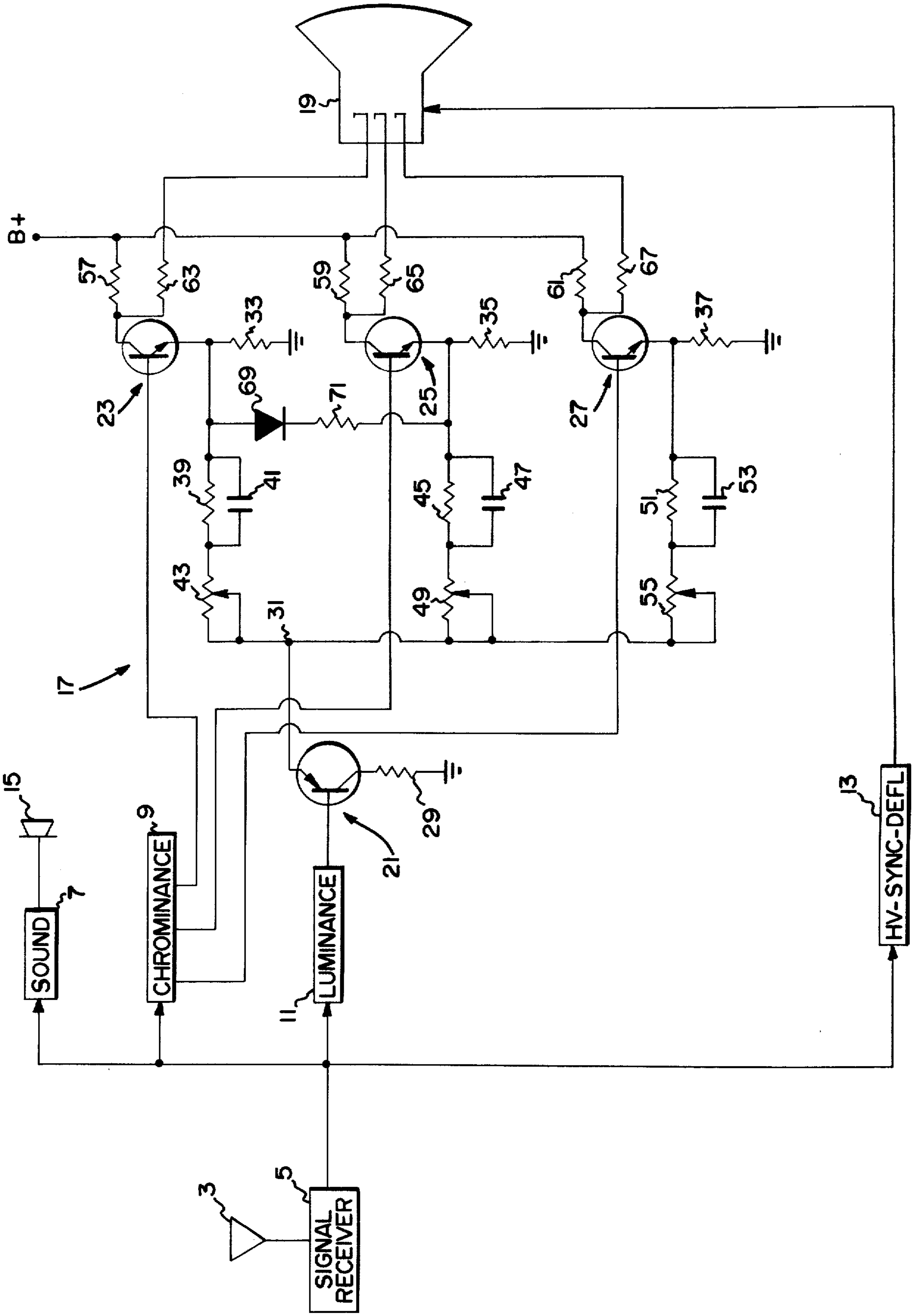
B+
SOUND
CHROMINANCE
LUMINANCE
SIGNAL RECEIVER
HV-SYNC-DEFL
3
5
7
9
11
13
15
17
19
21
23
25
27
29
31
33
35
37
39
41
43
45
47
49
51
53
55
57
59
61
63
65
67
69
71

UNIDIRECTIONAL COLOR ENHANCEMENT CIRCUIT

BACKGROUND OF THE INVENTION

In many color television receivers and particularly solid-state types of receivers, chroma signal demodulation and matrixing is performed in an integrated circuit. Thus, the only control readily available to a circuit designer, external to the integrated circuit (IC), is demodulation angle.

Usually, the outputs from the color demodulator stages are directly coupled to color (red, green, and blue) video output stages in which they are matrixed with the luminance signal for application to a color cathode ray tube. The drive controls normally employed to set the white balance for the cathode ray tube usually have an equal effect upon color difference and luminance gain for any given signal channel. Therefore, the relative color difference gains of the signal channels are not readily alterable apart from the luminance drives without resort to alterations of the internal IC circuitry or without adding other complex circuitry for increasing or decreasing the demodulator output signals and consequently adversely effecting the DC bias conditions of the signal channels.

One known form of color enhancement circuitry includes first, second, and third color amplifier stages with an impedance, such as a resistor, coupling the drive circuits of two or more of the amplifier stages. For example, a resistor may couple the drive circuit of the first or red amplifier stage to the second or green amplifier stage.

The above-mentioned circuitry provides for increased gain of a first or red amplifier stage but, the system is also, unfortunately, bi-directional. In other words, the second, or green amplifier stage, also has increased gain. Thus, the gain of both the first and second amplifier stages may be increased undesirably resulting in too little gain, by comparison, of the third or blue amplifier stage. Also, the signal at the second or green amplifier stage may be undesirably matrixed into the first or red amplifier stage whereupon chromaticity would be deleteriously effected.

OBJECTS AND SUMMARY OF THE INVENTION

An object of the present invention is to provide a television receiver having an enhanced color response. Another object of the invention is to improve the color response without deleterious effect upon the white balance of a color television receiver. Still another object of the invention is to provide circuitry for enhancing certain selected colors with respect to other colors displayed by a color television receiver. A further object of the invention is to provide circuitry for pre-selecting the level whereat enhancement of selected colors in a television receiver is effected.

These and other objects, advantages and capabilities are achieved in one aspect of the invention by a unidirectional color enhancement circuit wherein a series connected unidirectional conduction device and impedance couple the input circuits of at least two of a first, second and third amplifier stage.

BRIEF DESCRIPTION OF THE DRAWING

The sole FIGURE is an illustration, in block and schematic form, of a television receiver employing a preferred embodiment of a unidirectional color enhancement circuit.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawing.

Referring to the sole FIGURE of the drawings, a color television receiver includes the usual antenna 3 coupled to a signal receiver 5 wherefrom is provided a composite color television signal. This composite color television signal is applied to a sound channel 7, a chrominance channel 9, a luminance channel 11, and a high voltage, synchronization, and deflection channel 13.

The sound channel 7 is coupled to a loudspeaker 15. The luminance channel 11 is coupled by way of a luminance and color matrix network 17 to a color cathode ray tube 19. The chrominance channel 9 is also coupled via the luminance and color matrix network 17 to the color cathode ray tube 19. Moreover, the high voltage, synchronization, and deflection channel provides potentials for the color cathode ray tube 19 in a manner well known in the art.

The luminance and color matrix network 17 includes a video driver stage 21 and first, second, and third color amplifier stages 23, 25, and 27 respectively. The video driver stage 21, in this example, is in the form of a transistor having a base connected to the luminance channel 11, a collector coupled by a resistor 29 to circuit ground, and an emitter connected to a junction 31.

Each of the first, second and third or red, green and blue color amplifier stages 23, 25, and 27 includes a transistor having a first input circuit or base connected to a separate source of color difference signals in the chrominance channel 9. More specifically, the first or red color amplifier stage 23 has a base coupled to an R-Y or so-called red color difference signal source in the chrominance channel 9. The second or green color amplifier stage 25 has a base coupled to a G-Y or so-called green color difference signal source in the chrominance channel 9. Similarly, the third or blue color amplifier stage 27 has a base coupled to a B-Y or so-called blue color difference signal source in the chrominance channel 9.

Each of the first, second, and third color amplifier stages 23, 25, and 27 has a second input circuit including an emitter electrode coupled to circuit ground by a resistor 33, 35, and 37 respectively. The emitter electrode of the first color amplifier stage 23 is also connected via a parallel coupled resistor 39 and capacitor 41 in series with an adjustable resistor or drive control 43 to the junction 31 at the output of the video driver stage 21. The second input circuit of the second color amplifier stage 25 includes an emitter electrode connected via a parallel coupled resistor 45 and capacitor 47 in series with an adjustable resistor or drive control 49 to the junction 31. Moreover, the third color amplifier stage 27 is similarly connected with a second input circuit having an emitter electrode connected via a parallel coupled resistor 51 and capacitor 53 in series with an adjustable resistor or drive control 55 to the junction 31.

Each of the first, second, and third color amplifier stages 23, 25, and 27 has a collector electrode connected to a load or output circuit including a resistor 57, 59, and 61 coupled to a potential source B+. Each of the collector electrodes of the first, second, and third color amplifier stages 23, 25, and 27 is also connected by a resistor 63, 65, and 67 respectively to a cathode electrode of the color cathode ray tube 19.

Also, a unidirectional conduction device, such as a diode 69, and an impedance, such as a resistor 71, are series connected intermediate the second input circuits of the first, second, and third color amplifier stages 23, 25, and 27. Specifically, the diode 69 and resistor 71 series couple the second input circuits of the color amplifier stages 23 and 25 in this example.

Alternatively, the diode 69 and resistor 71 may be connected to couple the second input circuit of the second or green color amplifier stage 25 to the second input circuit of the third or blue color amplifier stage 27. Moreover, a plurality of unidirectional conduction devices as well as numerous connections between two of the second input circuits of the first, second, and third color amplifier stages 23, 25, and 27 are applicable and appropriate.

As to operation, it may first be observed that the unidirectional color enhancement circuit has little or no effect upon the DC bias conditions of the amplifier stages 23, 25, and 27. Also, the enhancement circuit does not affect the drive controls or the luminance drive for each of the output stages 23, 25, and 27.

More specifically, under a no color signal condition wherein only a luminance signal is present, the DC voltages at the emitter or second input circuits of the first, second, and third color amplifier stages 23, 25, and 27 will be substantially equal. As a result, the enhancement circuitry, diode 69 and resistance 71 in this instance, is completely cut off or just barely conducting and of no significance. Moreover, even if collector to base negative feedback is employed in the amplifier stages 23, 25, and 27, the luminance signal appearing at each one of the emitters or second input circuits will be small or nearly equal and a "balanced" effect will be achieved.

As to the enhancement circuitry, red or the first color amplifier stage 23 is being enhanced by the embodiment illustrated in the drawing. When the color difference signal R-Y appearing at the emitter electrode of the first color amplifier stage 23 becomes positive with respect to the color difference signal G-Y appearing at the emitter electrode of the second or green color amplifier stage 25 in an amount sufficient to overcome the forward voltage drop of the diode 69, the resistor 71 and forward resistance of the diode 69 are series connected between the emitters of the first and second color amplifier stages 23 and 25.

Since the input impedance of the emitter electrode or second input circuit of the green amplifier stages 25 and of the video driver stage 21 are very low compared with the impedance of the drive control circuitry for each of the amplifier stages, the gain of the first or red amplifier stage 23 is determined primarily by its load circuit divided by its emitter circuit impedance. Thus, the enhancement circuit, diode 69 and resistor 71, shunts the drive control circuit which lowers the resistance of the emitter circuit of the first or red color amplifier stage 23 and, in turn, increases the gain of the red or first color amplifier stage 23.

Thus, red enhancement is effected by returning the emitter circuit of the red color amplifier stage 23 via the enhancement circuit to the emitter circuit of the green color amplifier stage 25. When the R-Y signal is positive with respect to the G-Y signal, red is enhanced. Also, on yellow the R-Y and G-Y color difference signals are both positive whereupon enhancement is inhibited and the color yellow is prevented from becoming too orange due to increased red. On a red signal, green is negative with respect to red and enhancement is increased.

Alternatively, the use of wider demodulation angles, such as with many fleshtone correction circuits, causes a reduction in the green or G-Y signal whereupon the color yellow tends to become orangey and green grass tends to become bluish and objectionable. However, green enhancement can be effected by connecting the enhancement circuit, diode 69 and resistor 71, from the second input circuit or the green amplifier stage 25 to the second input circuit of the third or blue amplifier stage 27. Thereupon, the green components are restored and yellow no longer tends to appear as orange. Moreover, the green color is not increased with respect to blue, the color CYAN remains substantially correct, and the broadened red gamut needed for fleshtone compensation is not deleteriously effected.

Additionally, the utilization of diodes with different forward voltage drops, different bias requirements, and multiple diodes in series connection may be employed to design enhancement circuitry having desired characteristics. For example, saturated colors may be enhanced without boosting lower levels of color which may be noisy or amplitude sensitive such as fleshtones.

Thus, the enhancement circuitry may be employed for certain color enhancement. Also, the circuitry permits selection of the level whereat enhancement is to be effected. Moreover, the reference level for comparison with the desired color enhancement is readily selectable.

While there has been shown and described what is at present considered the preferred embodiments of the invention, it will be obvious to those skilled in the art that various changes and modifications may be made therein without departing from the invention as defined by the appended claims.

What is claimed is:

1. In a color television receiver having a luminance and color matrix system wherein first, second, and third color amplifier stages each have an output electrode coupled to a load circuit for applying a color signal to a cathode ray tube, an input electrode coupled to one of a plurality of color difference signal sources, and a second input electrode coupled by a drive circuit to a luminance signal source, the improvement comprising a unidirectional color enhancement circuit including a unidirectional conduction device and an impedance series coupling the second input electrode and drive circuit of two of said first, second, and third color amplifier stages.

2. The improvement of claim 1 comprising a unidirectional color enhancement circuit having a unidirectional conduction device connected to enhance current flow from said first to said second color amplifier stages and inhibit current flow from said second to said first color amplifier stages.

3. The improvement of claim 1 comprising a unidirectional color enhancement circuit having a unidirectional conduction device connected to enhance current flow from said second to said third color amplifier stage and to inhibit current flow from said third to said second color amplifier stages.

4. The improvement of claim 1 wherein said color difference signal source in said chrominance channel is in the form of an integrated circuit, a unidirectional color enhancement circuit in the form of a unidirectional conduction device and impedance external to said integrated circuit and series coupling two of said first, second, and third color amplifier stages.

5. The improvement of claim 1 wherein said first, second, and third color amplifier stages of said luminance and color matrix system are red, green, and blue color amplifier stages respectively and the unidirectional color enhancement circuit in the form of a unidirectional conduction device and impedance series connected to enhance current flow from said red to said green color amplifier stages.

6. The improvement of claim 1 wherein said first, second, and third color amplifier stages of said luminance and color matrix system are red, green, and blue color amplifier stages respectively and the unidirectional color enhancement circuit in the form of a unidirectional conductive device and impedance series connected to enhance current flow from said green to said blue amplifier stages.

7. In a color television receiver, a unidirectional color enhancement circuit comprising:

first, second, and third color amplifier stages each having an output electrode coupled to load circuit for providing a color signal, an input electrode coupled to one of a plurality of color difference signal sources, and a second input electrode coupled to a drive circuit connected to a luminance signal source; and a unidirectional conductive device and impedance series coupling two of said first, second, and third color amplifier stages.

8. The unidirectional color enhancement circuit of claim 7 wherein said second input electrodes of two of said first, second, and third color amplifier stages are coupled by a series connected unidirectional conduction device and an impedance.

9. The unidirectional color enhancement circuit of claim 7 wherein said first, second, and third color amplifier stages are red, green, and blue color amplifier stages respectively and said series connected unidirectional conduction device and impedance are coupled to enhance current flow from said red to said green color amplifier stages.

10. The unidirectional color enhancement circuit of claim 7 wherein two of said first, second, and third color amplifier stages are coupled by a plurality of series connected unidirectional conduction devices and an impedance.

* * * * *